Patented Nov. 6, 1923.

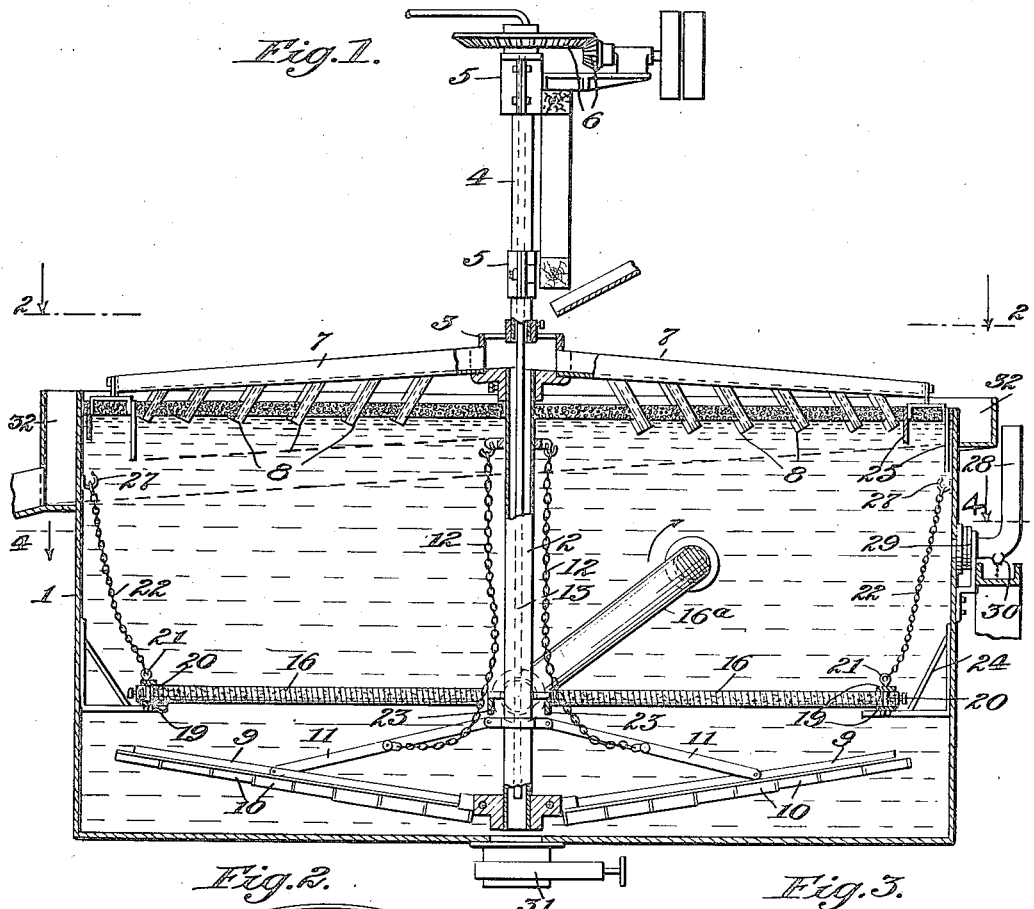
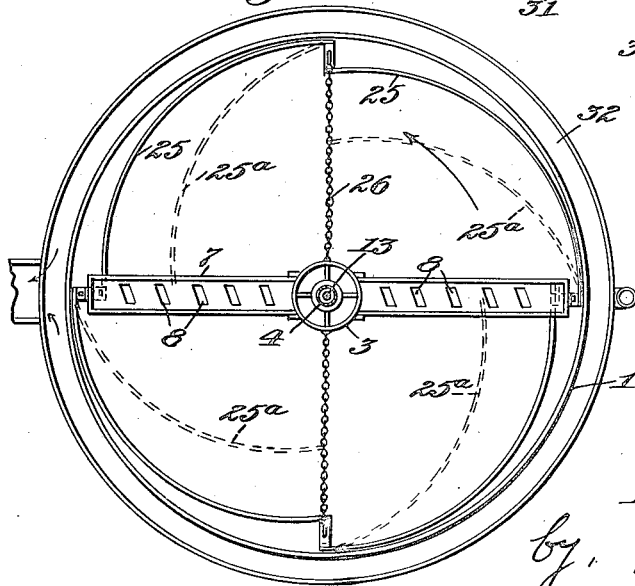
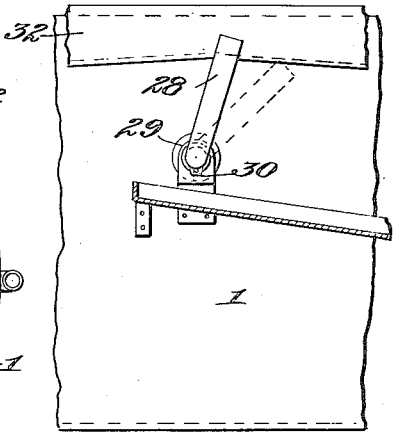

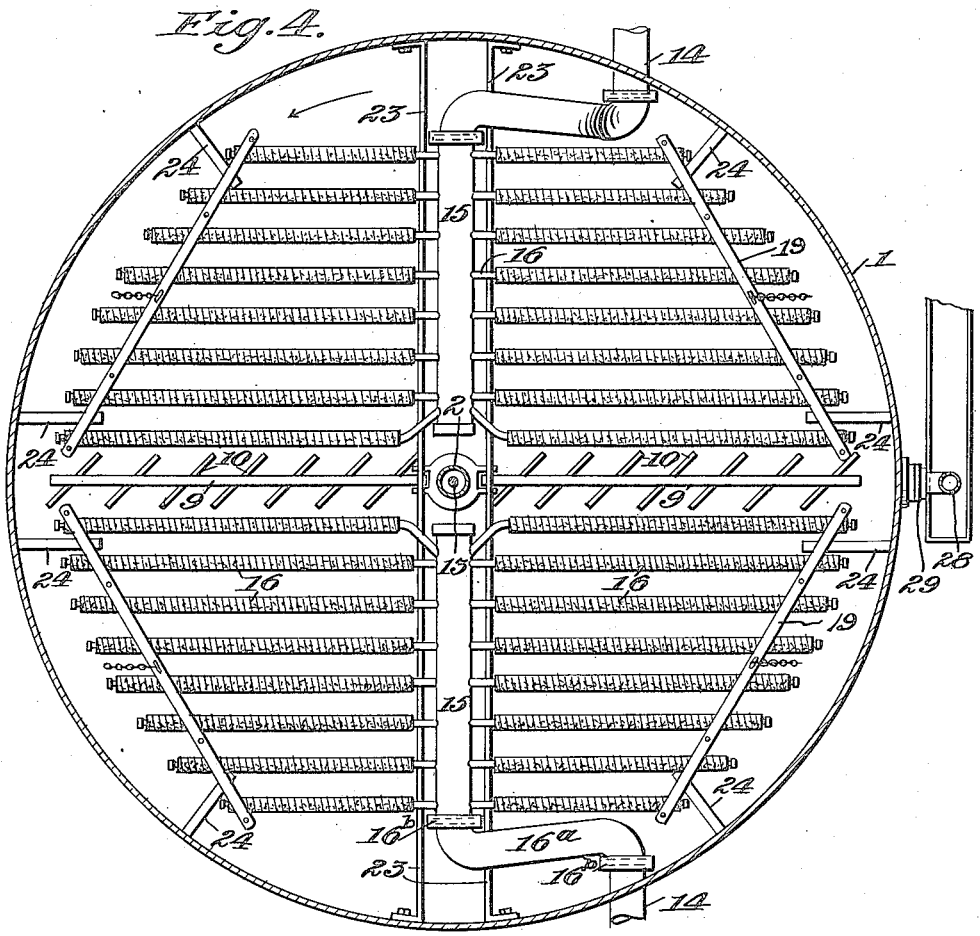

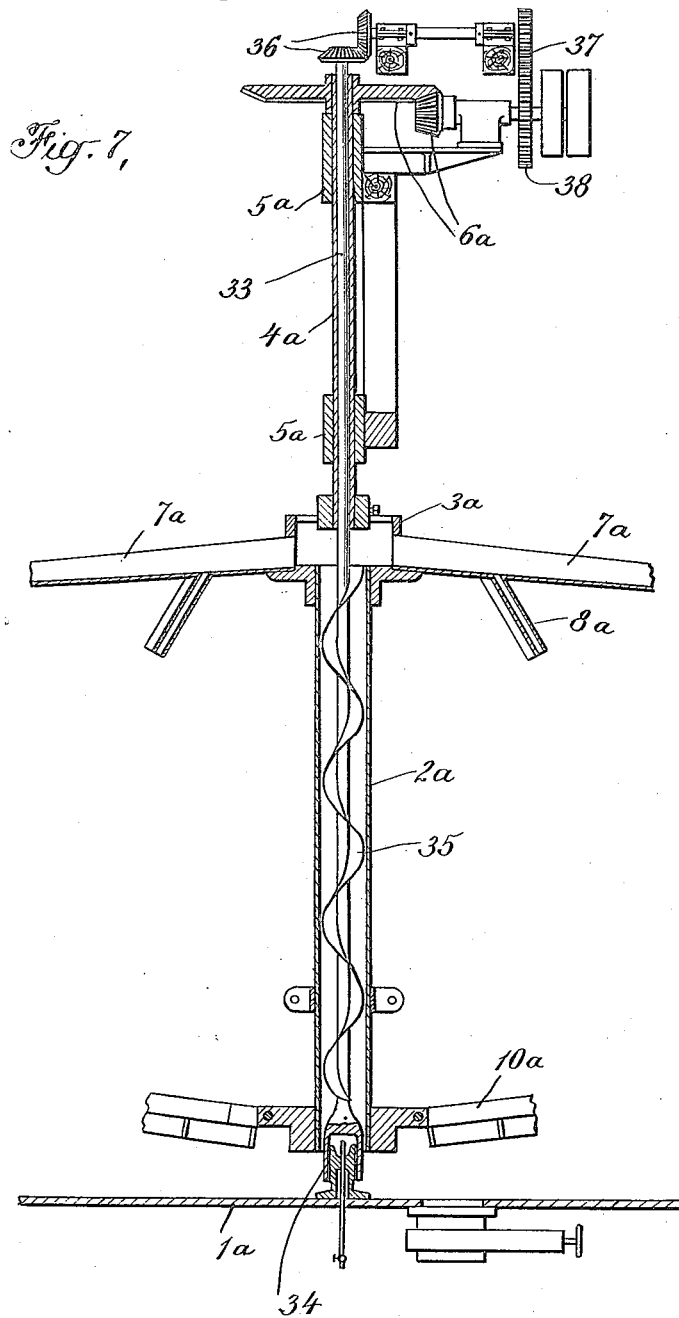

1,473,160

UNITED STATES PATENT OFFICE.

HALLET R. ROBBINS, OF FIERRO, NEW MEXICO.

APPARATUS FOR THE TREATMENT OF LIQUIDS AND LIQUID PULPS.

Original application filed October 21, 1919, Serial No. 332,345. Divided and this application filed December 21, 1920. Serial No. 432,291.

*To all whom it may concern:*

Be it known that I, HALLET R. ROBBINS, a citizen of the United States, residing at Fierro, in the county of Grant and State of New Mexico, have invented a certain new and useful Improvement in Apparatus for the Treatment of Liquids and Liquid Pulps, of which the following is a full, clear, and exact description.

My invention relates particularly to an apparatus for the treatment of liquids and liquid pulps, one of the uses of which may be for the concentration of ores by the froth flotation process, and is a division of my application filed October 21, 1919, Serial No. 332,345, in which the constituents of ores are separated as a froth formed by the aeration of a liquid pulp consisting of the finely-ground ore and water, modified by the presence of a flotation agent, such as finely-divided, emulsified or dissolved oils, or dissolved organic compounds or inorganic salts; but is also well adapted for other chemical, physical or metallurgical operations requiring efficient circulation and aeration of liquids or semi-liquids.

Among the objects of my invention are the provision of an apparatus which will be cheap both to install and to operate; efficient mechanically and metallurgically; adjustable to the varying conditions demanded by ores of differing physical and chemical characteristics; or by substances other than ores; and suited to the economical handling of large tonnages; and which has advantages in these respects over apparatus for the flotation treatment of ores or for similar purposes known or used at the present time.

When the flotation process was first discovered, the units of apparatus used were of small size and capacity, and the belief became wide-spread that such small units were necessary in any application of the flotation process, owing to the necessity of limiting the vertical and horizontal travel of the bubbles to distances rarely exceeding two or three feet. All types of flotation apparatus in commercial use at the present time accordingly, so far as I am aware, consist of a large number of comparatively small units. The larger units employed by me in lesser number simplify and cheapen installation, maintenance and operation.

In the early development of the flotation process, insoluble or difficultly soluble oils were used for promoting the flotation, and, in order to bring such oils into a proper state of sub-division of emulsification, violent mechanical agitation was used, which also beat air into the pulp, said air being in small bubbles which were permitted to rise to the surface of the pulp in a separate compartment, thus forming the mineral-bearing froth.

In certain types of apparatus not using mechanical agitation, the ore pulp is passed over a porous blanket, through which air is blown in large volume. Such porous blankets are rarely, if ever, of uniform porosity, and apparatus of this type in operation is practically always seen to show spots where air is escaping in too large bubbles, spouting up through the froth, contaminating it with gangue, and making it drop its accumulated load of floated minerals. Such porous blankets also retain in their meshes particles of minerals of high specific gravity, which soon results in greatly diminishing the porosity of the blanket, and in a tendency to increase the variation in the porosity of different portions of its surface. It is usually necessary to clean the blankets at least once each shift by sweeping or hosing, neither of which methods is completely efficient, and both of which cause a disturbance of the operating adjustments of the apparatus. This difficulty with heavy minerals settling out on porous blankets may be so serious as to preclude the successful treatment in apparatus of this type of ores of high specific gravity.

The object of the present invention is to avoid the limitations and objections above referred to, and, in addition, to introduce other features of advantage. Among the characteristic features of the invention are (1) a positive circulation of the pulp through the zone of aeration; (2) a substantially uniform distribution throughout the body of the ore pulp of the solids and of a very large number of extremely fine air bubbles; (3) provision for skimming the froth, where this is necessary or important; (4) an arrangement such that there is a minimum delay and inconvenience in restarting, after a sudden and unexpected failure of the power or air supply; (5) economy in power required; (6) economy in air, due to increased depth of pulp through which the air passes; (7)

cheap installation, with a minimum number of moving parts, and no parts moving at high speeds; (8) operation not requiring close and constant attendance; (9) economy of treatment of large tonnages of low grade ores; and (10) adaptation to either continuous treatment of ore pulp by flotation, or operation on the intermittent or charge system.

The nature and advantages of the invention will be further described and illustrated by the accompanying drawings and the following description illustrative of the preferred embodiment thereof and of the preferred construction and operation. It should be clearly understood however, that I do not limit myself to the precise form of apparatus shown in the drawings and described below, but may use other apparatus of different proportions, and with different details, operating on similar principles and accomplishing its results in substantially the same manner.

In the accompanying drawings,

Fig. 1 illustrates a preferred construction and embodiment of the invention, in central vertical section;

Fig. 2 is a top view taken on the line 2—2 of Fig. 1;

Fig. 3 is a detail view showing the tailings outlet;

Fig. 4 is a horizontal section taken on the line 4—4 of Fig. 1;

Fig. 5 is an enlarged view illustrating a preferred embodiment of the air distributing pipes;

Fig. 6 is a sectional view taken on the line 6—6 of Fig. 5; and

Fig. 7 is a sectional detail view illustrating a modification.

Referring to the accompanying drawings, and the reference numerals thereon:—

1 is an ordinary tank, of approximately cylindrical shape, with a flat bottom, and of relatively larger size than any container heretofore used for a flotation separation, in so far as I am aware. A suitable size would be about 18 feet in diameter, and about 10 feet deep. The tank may be made of wood-staves, steel plate, concrete or other suitable material. This tank 1 is provided with a hollow vertical conduit, 2, open at the bottom and top, and suspended from a connecting casting 3 which in turn is fastened to a vertical shaft 4 provided with suitable bearings 5 and driving mechanism 6 for imparting a comparatively slow rotary movement to the same. To the connecting casting, 3 are fastened two distributing launders 7 in the bottom of which are several short pipes or launders 8. To the bottom of the hollow vertical conduit are fastened inclined arms 9 provided with diagonal rabbles 10 and supported by the hinged links 11 to which are attached the chains 12. The inclined arms 9 are fastened to the hollow conduit 2 by means of hinged connections, about which they are free to rotate. A pipe 13 is provided for the introduction of air under pressure within the hollow conduit 2 near the bottom of the same.

14, 14, are air mains for conveying air under suitable pressure to the manifolds 15. The air mains are connected to the manifolds through the swivel joints 16$^b$ and the swivel pipes 16$^a$. Into the manifolds 15 are screwed, or to them are otherwise suitably connected, the air-tubes 16 an enlarged detail of which is shown in Fig. 5. These air-tubes 16 are closed at the outer ends, and consist of ordinary pipes, with small perforations 17 and tightly wrapped with one or more coils of rope 18, preferably woven of some material such as cotton which shrinks in length and increases in diameter when wet. The ends of the rope are firmly anchored by the clamps 18$^a$.

The outer ends of the air-tubes are held in place by the bars 19 fastened together at suitable intervals by the bolts 20 and provided with the eye-bolts 21 and lifting chains 22. The entire tube-grates, consisting of the manifolds and air-tubes are supported on the brackets 24 fastened to the sides of the tank 1. The tube-grates are not fastened to the brackets 24 but simply rest upon them.

25, 25, are a number, such as four, froth skimmers, consisting of light sections of sheet metal or other suitable substance, curved as shown, and with a sloping bottom edge, so proportioned that at its lowest point it is at or slightly below the pulp-level, and at its highest point it is about on the same level with the top of the tank 1. The froth skimmers may be supported substantially as shown, from the revolving launders 7 and from the shaft 4 through the chains 26. The action of the skimmers is supplemented by the action of the diagonally arranged distributing pipes 8. The inner ends of the skimmers 25 may be adjustable to different positions, to increase the skimming effect, e. g., to positions indicated in dotted lines at 25$^a$.

27 are hooks, so positioned as not to be interfered with by the froth skimmers, for supporting the ends of the lifting chains 22 attached to the tube-grates. 28 is a short piece of pipe, open at the end, and rotatable about the swivel joint 29 and provided with a small outlet 30 at its lowest point. The bottom of the tank is provided with an outlet in which is a gate valve 31. 32 is a launder surrounding the tank, sloping uniformly each way, substantially as shown, to a discharge point.

The operation of the apparatus is as follows. The tank 1 having been filled with pulp, the feed may be discharged continuously from a pipe or launder into the connecting casting 3 in which it joins and mixes with the stream of circulating pulp coming up the conduit 2 under the action of the air discharged from the pipe 13. The new feed and circulating pulp, mixed together, pass through the revolving launders 7 and pipes 8 which pass through the bed of froth, and discharge at or slightly beneath the pulp-level. In this way the pulp is uniformly distributed, over the surface of the contents of the tank beneath the froth, and hence without objectionable disturbance of the froth. As the ore particles in the pulp settle downward, they are exposed to the flotative action of the fine air bubbles emitted from the air-tubes, and those which are not floated eventually pass down between the air-tubes, and then are moved gradually toward the center of the tank by the rabbles 10 on the slowly-revolving arms 9. At the center, they are drawn up into the vertical hollow conduit 2 to replace the pulp forced upwards therein by air discharged from the pipe 13. It is seen that a positive circulation of the entire pulp is ensured, regardless of the size or weight of any individual particles therein.

The air discharged from the air-tubes 16 is brought into the apparatus by the fixed air main 14 and passes through the swivel pipe 16a and the manifold 15 into the air-tubes 16 and from them is discharged into the body of pulp, in the form of extremely fine bubbles, forced through the rope 18. The air bubbles travel a longer distance vertically than in existing forms of apparatus, due to the increased depth of the tank and of the pulp therein, and consequently have more opportunity to pick up flotable mineral. The bubbles form a froth on the surface of the pulp, which is not disturbed by the passage of the circulating pulp through the pipes 8. The froth is forced to the edge of the tank by the curved skimmers and by the diagonally arranged pipes 8 and is propelled by them over the edge into the collecting launder 32 from which it passes away from the apparatus as the finished product, or to a place of further treatment. The form of the skimmers, as well as the character of the curve and shape and form of the lower edge, may be varied to suit different conditions. In certain cases it is even feasible to dispense with the froth skimmers altogether, and permit the froth to overflow freely.

When the apparatus is used in a continuous process, there will usually be several units in series, and the tailings may be continuously withdrawn through the pipe 28 discharging into a launder leading to the next machine, or to waste, as the case may be. The pulp level in the tank is regulated by the position of the end of the pipe 28 and this position may be simply and readily adjusted by rotating the pipe 28 around the swivel joint 29. In order to prevent the choking of the pipe 28 by particles too heavy to be carried upward by the velocity of the pulp-stream therein, the small hole 30 is provided through which heavy and coarse particles may pass directly out of the machine. The size of this hole is such as to limit its capacity as a discharge orifice to less than the product of the apparatus, and in that way it cannot affect the pulp-level which will be dependent solely on the vertical position of the end of the discharge-pipe.

If it is desired to use the apparatus on the charge or intermittent system, the discharge pipe 28 may be dispensed with, or raised to an inoperative position, the tank 1 filled by any convenient means, the charge being circulated through the zone of aeration provided by the air discharged through the tubes 16 until the proper separation has been made, when the remaining material may be drawn off through the gate-valve 31. In order to combine the advantages of intermittent and continuous operation, an even number of units of the apparatus may be used, and at any given moment half of them would be in process of being filled or emptied and the other half would be under circulation and aeration. The removal of the froth would be similar in intermittent or continuous operation of the apparatus.

The quantity of air discharged through the end of the pipe 13 should and need be no more than just enough to impart the desired upward velocity to the pulp in the hollow conduit 2 on the principle of the air-lift, well recognized as one of the most economical methods for the elevation of liquids through small differences of elevation. This air is not used to agitate the pulp, nor as a means of introducing bubbles to collect the mineral and form a froth, and practically all of it escapes directly into the atmosphere from the top of the connecting casting 3 as soon as it has fulfilled its sole function of elevating the pulp within the hollow conduit 2. The quantity of air discharged through the air-tubes 16 should and need be no more than enough to furnish the bubbles to collect the mineral and form the froth. No agitation is required, as choking of the apparatus by settled mineral is prevented by the rabbles 10 which keep everything in constant motion toward the entrance of the vertical conduit. The function of the rabbles 10 is solely to move the settled pulp slowly toward the center of the apparatus, and they move far too slowly to "agitate" it in the slightest degree.

Should occasion require the raising of the arms, without emptying the apparatus, this may be readily accomplished by turning the rotating shaft 4 by hand power if necessary, as the power required is very small, until the arms 9 are directly beneath the clear space provided between the two tube-grates when nothing will interfere with the raising of the arms 9. In the event of a sudden failure of the power supply, and consequent stoppage of the revolving arms 9 the pulp will immediately begin to settle on the bottom of the tank, and if the delay in re-starting should be considerable, and if the apparatus is not emptied, the tube-grates may advantageously be lifted all or part way out of the tank. This may be accomplished without delay or difficulty of any kind, and without disconnecting any pipes, by simply turning the vertical shaft until the launders 7 are directly over the clear space between the two tube-grates, then attaching the ends of the lifting chains 22 which are maintained within easy reach, on the hooks 27, to blocks conveniently suspended from the roof overhead, and hoisting the tube-grates as high as desired, the air connections merely turning on the swivel joints 16ᵇ. This procedure for removing the tube-grates from the tank may be used in case of necessity for repairing or renewing the air-tubes 16 obviating any necessity for emptying the apparatus, and reducing the effects of the interruption to the continuity of its operation to a minimum. In re-starting after a considerable period of delay with the tank full of pulp, the arms 9 should be lowered until the chains 12 are slack, the vertical shaft 4 should be caused to rotate, and air turned on through the pipe 13. When the arms 9, have worked their way down to their normal position, the tube-grates should be lowered into their position, when the air may be turned into them, the feed to the apparatus turned on, and normal operation resumed. As an alternative to the use of an air-lift for elevating the pulp in the hollow conduit, mechanical means may be used if desired, such as a boat propeller, or Archimedean screw or other device not wasting power in violent agitation of the pulp. Such modification is illustrated in Figure 7 of the drawings, wherein the hollow vertical conduit 2ᵃ is suspended from a connecting casting 3ᵃ which is fastened to a vertical hollow shaft 4ᵃ which is driven rotatively by beveled gearing 6ᵃ at the upper portion thereof. To the connecting casting 3ᵃ are fastened distributing launders 7ᵃ in the bottom of which are several short pipes or launders 8ᵃ. Centrally of the hollow shaft 4ᵃ is a shaft 33, rotatively driven by beveled gears 36 which, in turn, are driven from the gears 37, 38, the latter being on the main driving shaft which may carry the usual loose and tight pulleys. The shaft 33 is provided with a screw 35 for elevating the pulp, and the lower portion of the shaft is provided with a hollow bearing part 34 to fit over a fixed member in the bottom of the tank 1ᵃ, whereby the shaft is rotatively supported for movement above the bottom of the tank.

It is to be understood that other forms of tube-grate may be used, differing from that particularly described herein, all that is necessary being some device for emitting fine air-bubbles, uniformly distributed, and through which the pulp can pass in its path of circulation, although I consider the specific construction of the tube-grate illustrated and described as novel and advantageous.

The apparatus herein shown and described is not confined to use in a flotation process of the character claimed in my application above referred to, but such apparatus may be used for any purposes requiring circulation and aeration of a liquid pulp.

The process which is performed by the apparatus as disclosed herein is claimed in my prior application above referred to.

I claim:—

1. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, and pulp dischargers substantially uniformly distributed along a line extending across said vessel at a level below the upper surface of the pulp and above said air dischargers.

2. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed on a line extending across said vessel at a level below the upper surface of the pulp, and above said air dischargers, and means for rotating said pulp dischargers.

3. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed along a line extending across said vessel at a level below the upper surface of the pulp, and above said air dischargers, and means for withdrawing pulp from the lower part of said vessel and returning it thereto through said pulp dischargers.

4. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed along a line extending across said vessel at a level below the upper surface of the pulp and above said air dischargers, means for withdrawing pulp from the lower part of said vessel and returning it thereto through said pulp dischargers, and means for rotating said pulp dischargers.

5. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed along a line extending across said vessel at a level below the upper surface of the pulp and above said air dischargers, and an air-lift for withdrawing pulp from the lower part of said vessel and returning it thereto through said pulp dischargers.

6. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed along a line extending across said vessel at a level below the upper surface of the pulp, and above said air dischargers, an air-lift for withdrawing pulp from the lower part of said vessel and returning it thereto through said pulp dischargers, and means for rotating said pulp dischargers.

7. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed along a line extending across said vessel at a level below the upper surface of the pulp and above said air dischargers, means for withdrawing pulp from the lower part of said vessel and returning it thereto through said pulp dischargers, and means for causing the lower strata of said pulp to move toward the point from which pulp is withdrawn.

8. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, pulp dischargers substantially uniformly distributed along a line extending across said vessel at a level below the upper surface of the pulp and above said air dischargers, means for withdrawing pulp from the lower part of said vessel and returning it thereto through said pulp dischargers, means for causing the lower strata of said pulp to move toward the point from which pulp is withdrawn, and means for rotating said pulp dischargers.

9. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, and also by a clearance space extending completely across the vessel, and a pulp discharger extending diametrically across the upper part of said vessel, said pulp discharger being of less width than said clearance space, whereby said air dischargers may be raised above said pulp discharger.

10. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, and also by a clearance space extending completely across the vessel, a pulp discharger extending diametrically across the upper part of said vessel, said pulp discharger being of less width than said clearance space, whereby said air dischargers may be raised above said pulp discharger, and means for rotating said pulp discharger.

11. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, and also by a clearance space extending completely across the vessel, a pulp discharger of less width than said clearance space extending diametrically across the upper part of said vessel, and a rabble of less width than said clearance space below said air discharger, whereby said rabble may pass through said clearance space and said air dischargers may be elevated above said pulp discharger.

12. In a flotation concentration apparatus, a vessel for containing pulp, air dischargers substantially uniformly distributed throughout the horizontal cross-sectional area of said vessel at a level intermediate the bottom and top thereof, said air dischargers being separated by spaces for the passage of pulp, and also by a clearance space extending completely across the vessel, a pulp discharger of less width than said clearance space extending diametrically across the upper part of said vessel, a rabble of less width than said clearance space below said air dischargers, whereby said rabble may pass through said clearance space and said air dischargers may be elevated above said pulp discharger, and means for rotating said pulp discharger.

13. An apparatus for the flotation treatment of ores, comprising a cylindrical receptacle for containing a relatively large and deep body of pulp, air introduction means arranged above the bottom of the receptacle for introducing fine air bubbles through porous material, a central rotating hollow shaft, rotating rabble arms carried thereby below the air introduction means for moving the pulp towards the center of the receptacle, a launder carried by said central shaft above the pulp level and having depending discharge pipes or launders extending through the froth level into the pulp, and means for raising the pulp through said central hollow shaft and introducing the same through said launders and discharge pipes.

In testimony whereof I have hereunto set my hand this 16th day of December, A. D. 1920.

HALLET R. ROBBINS.

Witnesses:
  ALICE BARWISE,
  JAMES D. SHROVER.